United States Patent
Onomura

(10) Patent No.: US 7,616,827 B2
(45) Date of Patent: Nov. 10, 2009

(54) IMAGE PROCESSING METHOD AND IMAGE PROCESSING DEVICE

(75) Inventor: Kenichi Onomura, Nishitokyo (JP)

(73) Assignee: Olympus Imaging Corp., Tokyo (JP)

( * ) Notice: Subject to any disclaimer, the term of this patent is extended or adjusted under 35 U.S.C. 154(b) by 694 days.

(21) Appl. No.: 11/338,406

(22) Filed: Jan. 24, 2006

(65) Prior Publication Data

US 2006/0164520 A1     Jul. 27, 2006

(30) Foreign Application Priority Data

Jan. 25, 2005 (JP) ............................. 2005-017121

(51) Int. Cl.
*G06K 9/40* (2006.01)
*H04N 5/228* (2006.01)

(52) U.S. Cl. .................... 382/260; 348/222.1

(58) Field of Classification Search ................ 382/260, 382/232, 251, 262, 264, 162, 166, 298, 299; 348/242, 247, 222, 246, 256, 222.1, 405.1; 358/445

See application file for complete search history.

(56) References Cited

U.S. PATENT DOCUMENTS 6,774,943 B1 * 8/2004 Kao et al. ................ 348/252
7,133,073 B1 * 11/2006 Neter ....................... 348/272
7,397,964 B2 * 7/2008 Brunner et al. ........... 382/264
2006/0164520 A1 * 7/2006 Onomura ................. 348/222.1

FOREIGN PATENT DOCUMENTS

| JP | 2000-165664 | 6/2000 |
|----|-------------|--------|
| JP | 2002-171535 | 6/2002 |
| JP | 2004-158948 | 6/2004 |

OTHER PUBLICATIONS

Chinese Office Action to Chinese Patent Application No. 200610002933X, dated May 18, 2007 (4 pgs.) with translation (2 pgs.).

Notice of Reasons for Rejection for Japanese Patent Application No. 2005-017121, mailed Jul. 21, 2009 (3 pgs.) with translation (3 pgs.).

* cited by examiner

*Primary Examiner*—Yon Couso
(74) *Attorney, Agent, or Firm*—Straub & Pokotylo; John C. Pokotylo

(57) ABSTRACT

There is disclosed an image processing method wherein there is read, from a memory, an image signal which contains a plurality of image components and in which a sampling ratio as a ratio of sampling frequencies of these image components is not matched. The sampling ratio of the read image signal is converted to match the sampling ratio of the image signal. The image signal whose sampling ratio has been converted is filtered. The sampling ratio of the filtered image signal is converted to reduce a data size of the signal.

12 Claims, 12 Drawing Sheets

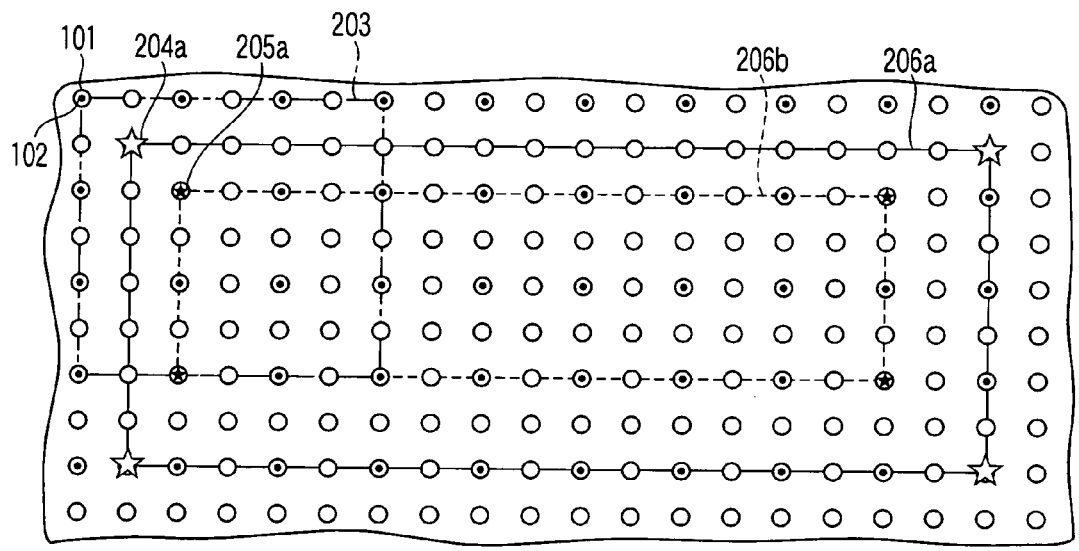
F I G. 12A
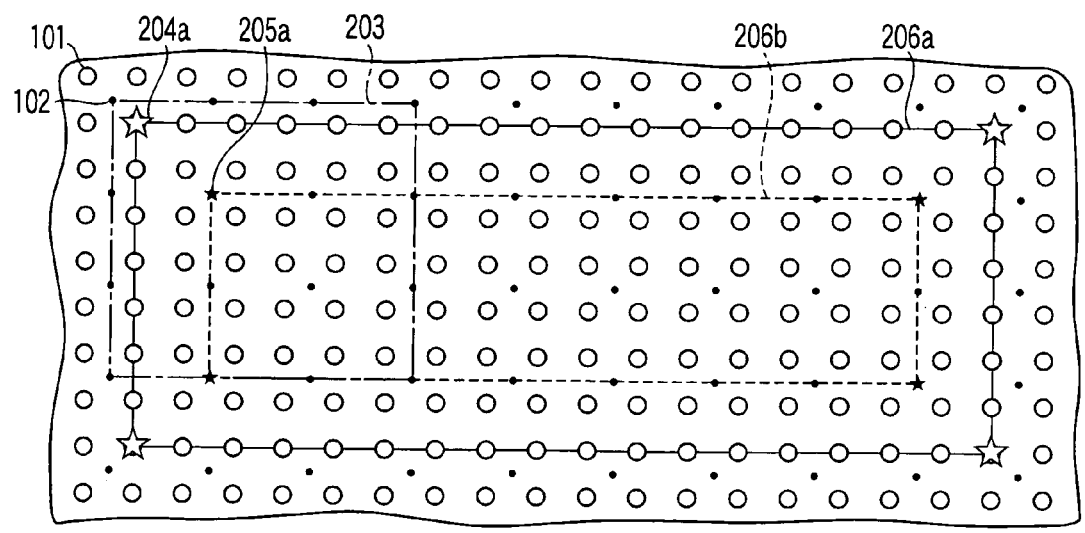
F I G. 12B

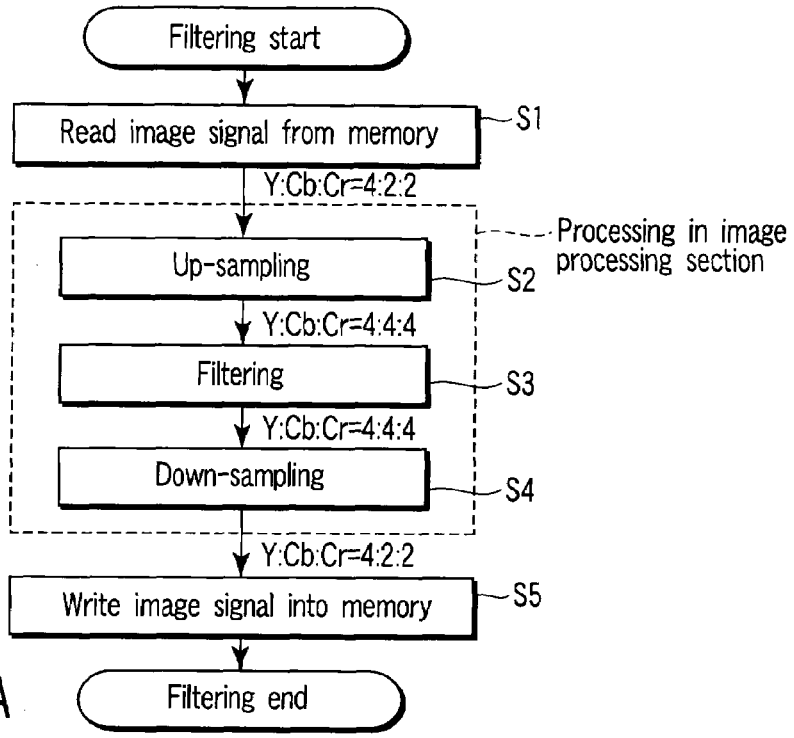
F I G. 13A
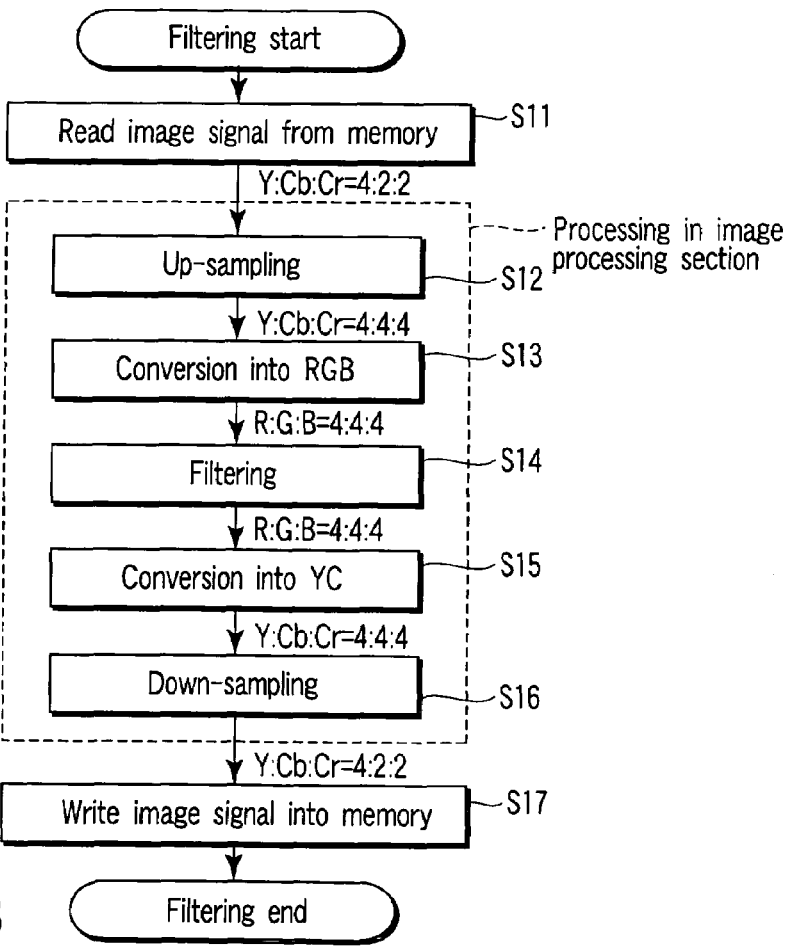
F I G. 13B

IMAGE PROCESSING METHOD AND IMAGE PROCESSING DEVICE

CROSS-REFERENCE TO RELATED APPLICATIONS

This application is based upon and claims the benefit of priority from prior Japanese Patent Application No. 2005-017121, filed Jan. 25, 2005, the entire contents of which are incorporated herein by reference.

BACKGROUND OF THE INVENTION

1. Field of the Invention

The present invention relates to an image processing method and an image processing device, and more particularly, it relates to an image processing method and an image processing device in a case where an image is filtered.

2. Description of the Related Art

In Jpn. Pat. Appln. KOKAI Publication No. 2004-158948, a technology is proposed in which a sampling frequency ratio of image components (Y, Cb, Cr) of a luminance and color difference signal obtained by decoding is converted into Y:Cb:Cr=4:1:1 having a small data size in a case where JPEG image data recorded in a JPEG system is printed. The use of such technology can reduce the data size in a case where an image signal is stored in a memory. Human eyes are sensitive to a change of the luminance, but are comparatively insensitive to a change of the color difference. Therefore, even when an amount of color difference information is lowered, a printed image is not unnatural to the human eyes.

The image recorded in the JPEG system is sometimes displayed on a display monitor such as a liquid crystal monitor. In general, a field angle of the image during the recording is different from a field angle displayable in the display monitor in many cases. Therefore, when a JPEG image is reproduced in the display monitor, the image recorded in the JPEG system is decoded, and this decoded image is subjected to resize processing (usually reduction processing). Accordingly, the field angle of the image is changed to the field angle displayable in the display monitor to display the image. Such resize processing is performed by subjecting the image signal to predetermined filtering.

BRIEF SUMMARY OF THE INVENTION

According to a first aspect of the present invention, there is provided an image processing method comprising:

reading, from a memory, an image signal which contains a plurality of image components and in which a sampling ratio as a ratio of sampling frequencies of these image components is not matched;

converting the sampling ratio of the image signal to match the sampling ratio of the read image signal;

filtering the image signal whose sampling ratio has been converted; and converting the sampling ratio of the filtered image signal to reduce a data size of the filtered image signal.

According to a second aspect of the present invention, there is provided an image processing device which filters a digitized image signal, comprising:

a storage section to store an image signal which contains a plurality of image components and in which a sampling ratio is not matched every image component;

a first converting section which reads out the image signal stored in the storage section and which converts the sampling ratio of the image signal to match the sampling ratio every image component;

a filtering section which filters the image signal whose sampling ratio has been matched every image component by the first converting section; and a second converting section which converts the sampling ratio of the filtered image signal to reduce a data size of the image signal filtered by the filtering section.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 12A is a diagram showing an outline of the filtering of the YC signal having a sampling ratio of 4:2:0 and arranged as shown in FIG. 4A by use of the 4×4 weighting filter;

FIG. 12B is a diagram showing an outline of the filtering of the YC signal having a sampling ratio of 4:2:0 and arranged as shown in FIG. 4B by use of the 4×4 weighting filter;

FIG. 13A is a flowchart showing a flow of processing in an image processing method of one embodiment of the present invention in a case where the YC signal is filtered;

FIG. 13B is a flowchart showing a flow of processing in an image processing method of one embodiment of the present invention in a case where an RGB signal is filtered.

DETAILED DESCRIPTION OF THE INVENTION

An embodiment of the present invention will be described hereinafter with reference to the drawings.

Figure 1:
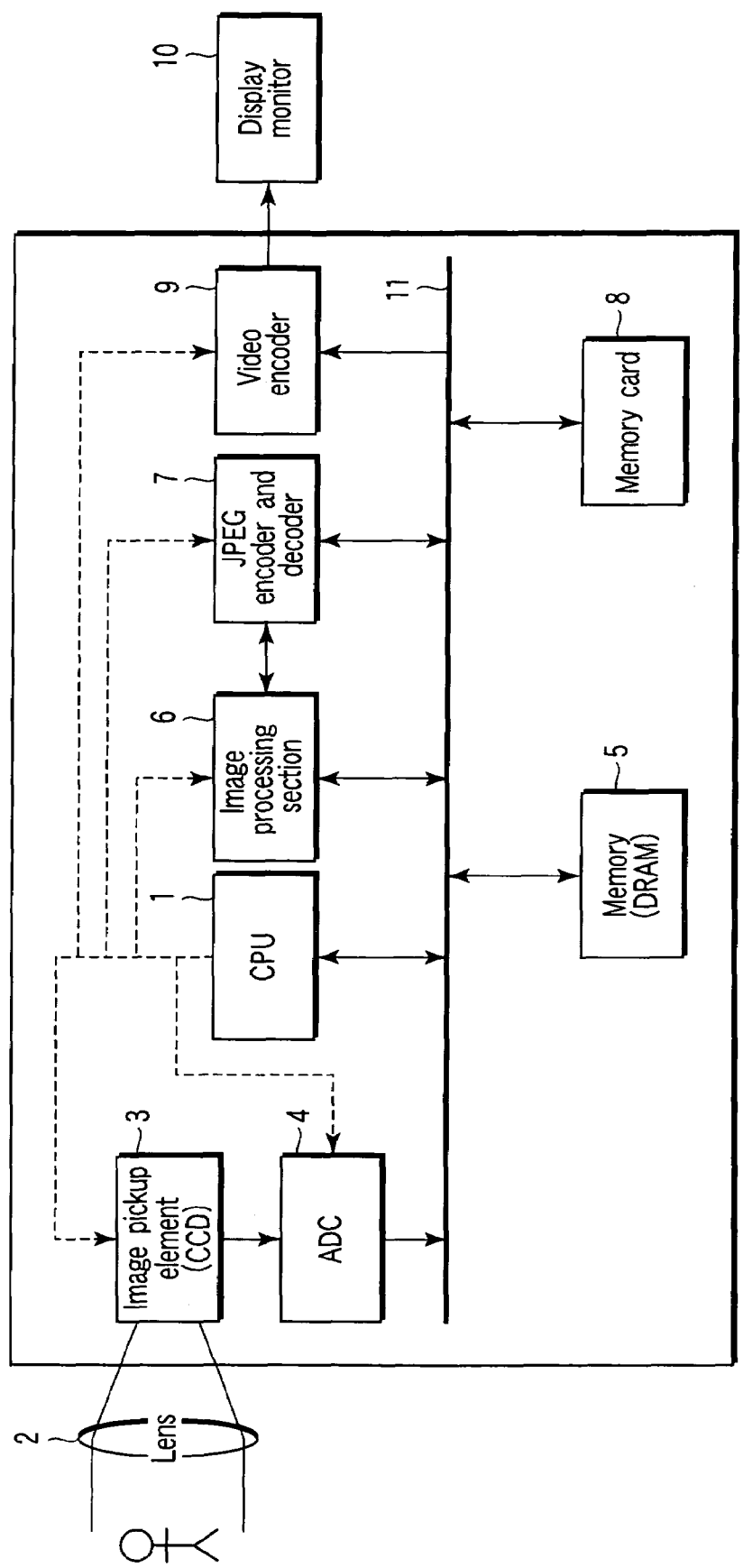
FIG. 1 is a diagram showing a constitution of a digital camera including an image processing device in one embodiment of the present invention.

FIG. 1 is a diagram showing a constitution of a digital camera including an image processing device in one embodiment of the present invention. The digital camera shown in FIG. 1 is constituted of: a CPU 1; a lens 2; an image pickup element 3; an AD converter (shown as ADC in the drawing) 4; a memory 5; an image processing section 6; a JPEG encoder and decoder 7; a memory card 8; a video encoder 9; a display monitor 10 and a bus 11.

The CPU 1 controls sections of the digital camera shown in FIG. 1. For example, the CPU 1 controls an operation of the image pickup element 3, controls reading of an image signal obtained by the image pickup element 3, and controls operations of the ADC 4, the image processing section 6, the JPEG encoder and decoder 7, and the video encoder 9.

In FIG. 1, a luminous flux incoming from a subject via the lens 2 is formed into an image on the image pickup element 3 constituted of a CCD or the like. The image pickup element 3 converts the luminous flux from the subject into an analog image signal. The image signal (RGB image signal) obtained by the image pickup element 3 is read out at a predetermined timing and input into the ADC 4 under the control of the CPU 1. The ADC 4 converts the analog image signal into a digital image signal. The digital image signal converted by the ADC 4 is stored in the memory 5 as a storage section via a bus 11. Here, the memory 5 is constituted of, for example, a DRAM or the like.

During recording of the image, the image signal stored in the memory 5 is read out by the image processing section 6. The image processing section 6 first adjusts a white balance of the image signal. Thereafter, the section converts the RGB image signal into a luminance and color difference signal (hereinafter referred to as the YC signal). After converting the RGB image signal into the YC signal, the image processing section 6 subjects the Y signal to gradation correction processing and subjects the C signal (Cb, Cr) to color correction processing. It is to be noted that processing such as the color correction processing or the gradation correction processing may be performed on the RGB signal.

Thereafter, in order to reduce a data size of the image signal, the image processing section 6 converts (down-sampling) a ratio (hereinafter referred to as the sampling ratio) of sampling frequencies of image components of the YC signal. In this case, the sampling ratio is, for example, Y:Cb:Cr=4:2:2. A sampling ratio Y:Cb:Cr=4:2:0 is used in a moving image.

In general, human eyes are sensitive to a change of luminance, but comparatively insensitive to a change of color difference. Therefore, even if color difference information is reduced and sampling is performed, a reproduced image or the like is not unnatural to the human eyes.

The image signal processed in the image processing section 6 is input into the JPEG encoder and decoder 7. The JPEG encoder and decoder 7 subjects the input image signal to JPEG coding by a technology such as DCT conversion.

After the image signal coded in the JPEG encoder and decoder 7 is once stored in the memory 5, the signal is recorded as a JPEG file to which predetermined header information has been added in the memory card 8.

Here, in the present embodiment, the image signal is processed without being stored in the memory 5 from a time when the image signal is input into the image processing section 6 until the image signal is JPEG-coded in the JPEG encoder and decoder 7.

Moreover, during through-displaying of the image obtained by the image pickup element 3, the image processing section 6 resizes (usually reduces) the YC signal into a predetermined size depending on specifications of the display monitor 10. Furthermore, after the conversion (down-sampling) of the sampling ratio of the respective image components of the YC signal, the signal is stored in the memory 5. The image signal stored in the memory 5 is read out by the video encoder 9 every frame, and the signal is displayed as the image in the display monitor 10 constituted of, for example, a liquid crystal monitor via the video encoder 9.

Furthermore, when the JPEG image signal recorded in the memory card 8 is reproduced, the JPEG encoder and decoder 7 reads out the JPEG image signal recorded in the memory card 8 to decode the signal by a technology such as inverse DCT conversion. Thereafter, the image processing section 6 reduces the YC signal obtained by the decoding into the predetermined display size, and then once stores the signal in the memory 5. The YC signal stored in the memory 5 is displayed as an image in the display monitor 10 via the video encoder 9. Reproduction processing of this JPEG image signal will be described later in detail.

Next, there will be described an image processing method in the present embodiment by use of the image processing device of FIG. 1.

Figure 2:
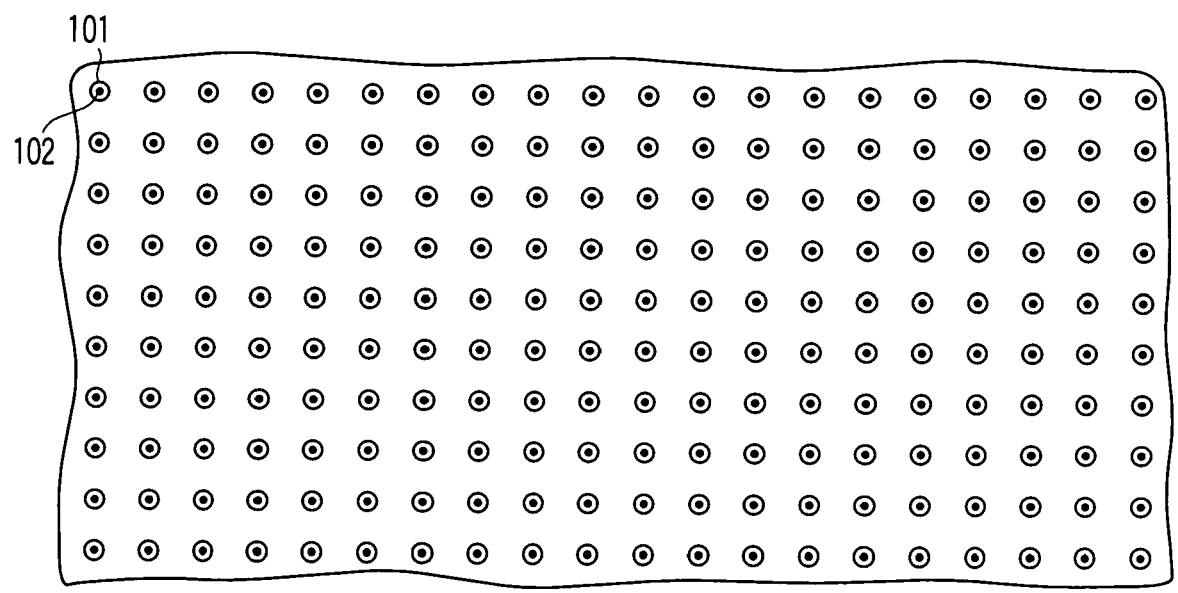
FIG. 2 is an arrangement diagram of image components of a YC signal having a sampling ratio of 4:4:4.

FIG. 2 is an arrangement diagram of the image components of the YC signal having a matched sampling ratio. It is to be noted that an example of FIG. 2 shows a case where the sampling ratio is Y:Cb:Cr=4:4:4. In FIG. 2, positions of Y are shown by white circles 101. On the other hand, positions of C (Cb, Cr) are shown by black circles 102.

In a case where the sampling ratio is 4:4:4, after the sampling, Y information amount is equal to Cb or Cr information amount. In this case, as shown in FIG. 2, sampling positions of Y can all agree with those of Cb and Cr. Here, the data size at the sampling ratio of 4:4:4 is (Y data size)+(Cb data size)+(Cr data size).

Figure 3A:
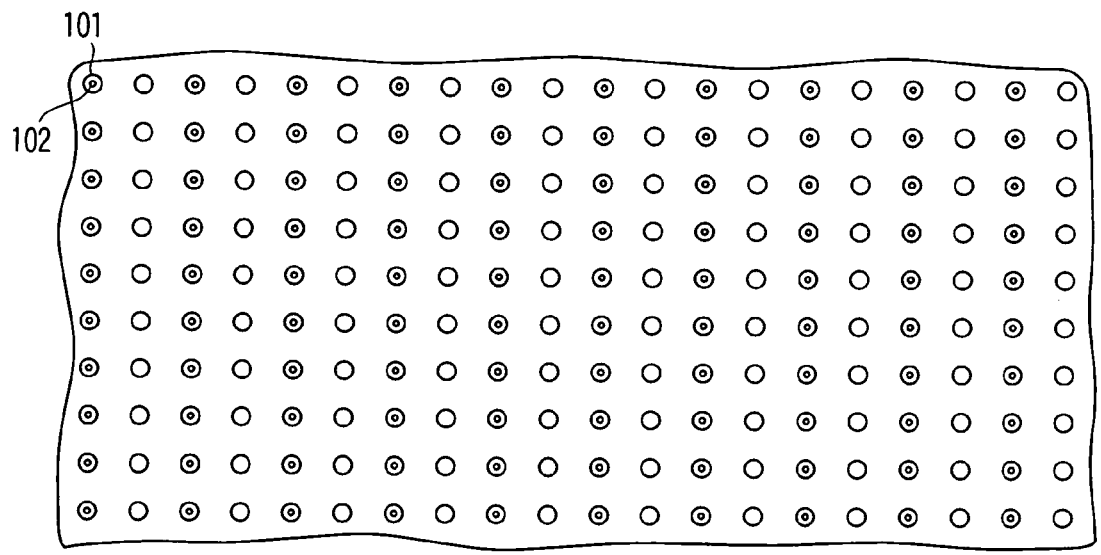
FIG. 3A is an arrangement diagram of the respective image components of the YC signal having a sampling ratio of 4:2:2 and in which positions of Y agree with those of Cb and Cr.
Figure 3B:
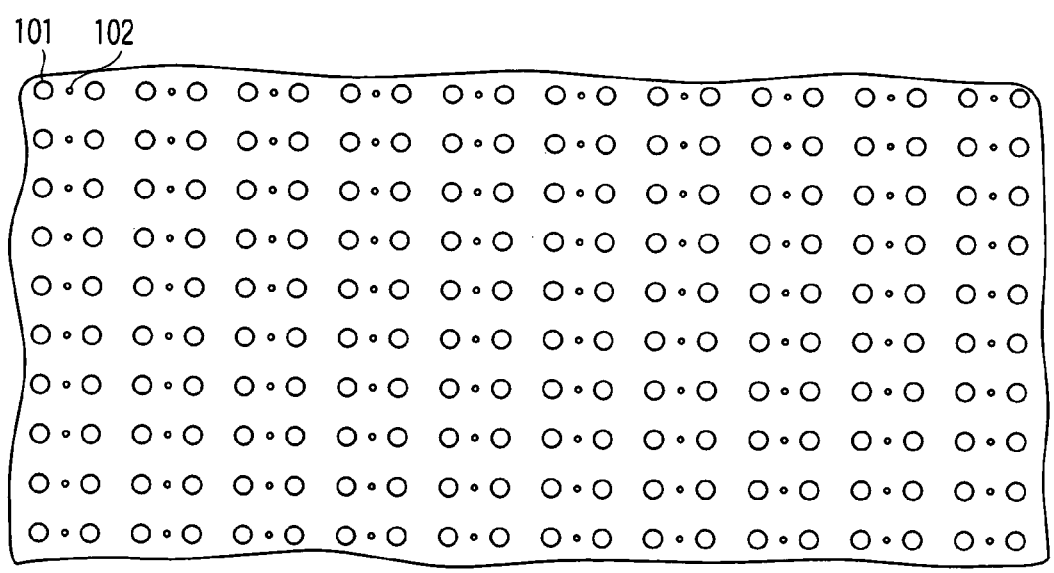
FIG. 3B is an arrangement diagram of the respective image components of the YC signal having a sampling ratio of 4:2:2 and in which Cb and Cr are positioned in the center of the positions of Y.

FIGS. 3A and 3B are arrangement diagrams of the respective image components of the YC signal in which the sampling ratio is not matched. Examples of FIGS. 3A and 3B show a case where the sampling ratio is Y:Cb:Cr=4:2:2.

When the sampling ratio is 4:2:2, the information amount of Cb or Cr in a horizontal direction is ½ of that of Y. In this manner, the information amount is reduced so that two horizontal pixels share one piece of color difference information in a case where the sampling ratio is 4:2:2. Here, the color difference information may be obtained by simple thinning, and may be obtained from an average value every two horizontal pixels.

Moreover, when the sampling ratio is 4:2:2, there are a case where the sampling positions of Cb and Cr agree with those of Y (the position agrees with one of two positions of Y) as shown in FIG. 3A and a case where the sampling position of Cb or Cr agrees with the center between two positions of Y as shown in FIG. 3B. The whole data size at the sampling ratio of 4:2:2 is (Y data size)+(½×Cb data size)+(½×Cr data size) in either of FIGS. 3A and 3B. Therefore, the data size at the sampling ratio of 4:2:2 is ⅔ of that at the sampling ratio of 4:4:4.

Figure 4A:
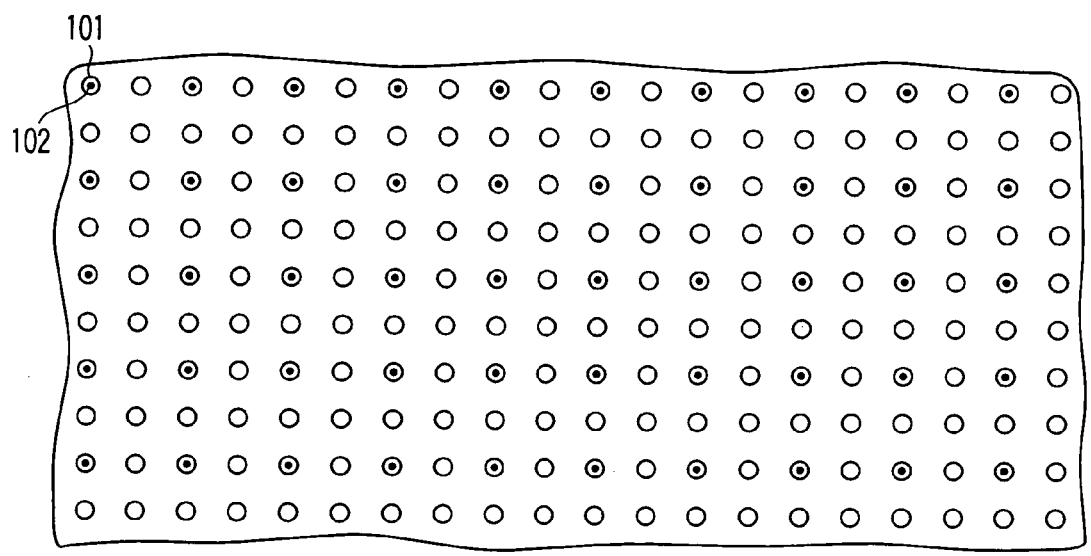
FIG. 4A is an arrangement diagram of the respective image components of the YC signal having a sampling ratio of 4:2:0 and in which the positions of Y agree with those of Cb and Cr.
Figure 4B:
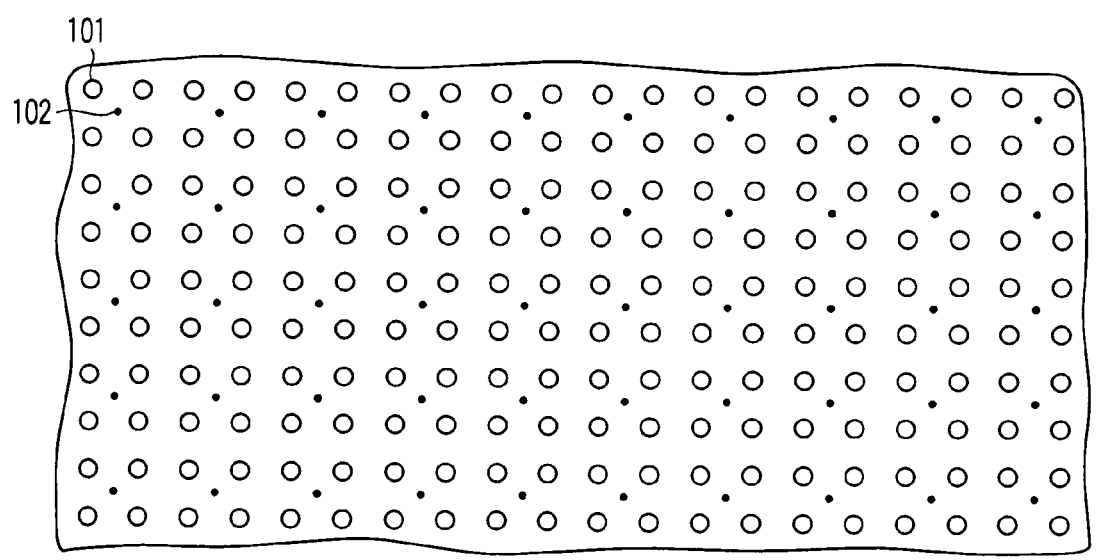
FIG. 4B is an arrangement diagram of the respective image components of the YC signal having a sampling ratio of 4:2:0 and in which Cb and Cr are positioned in the center of the positions of Y.

Moreover, FIGS. 4A and 4B are arrangement diagrams of the respective image components of the YC signal in a case where the sampling ratio is Y:Cb:Cr=4:2:0.

When the sampling ratio is 4:2:0, each of the Cb and Cr information amounts in not only the horizontal direction but also a vertical direction is ½ of the information amount of Y. In this manner, in a case where the sampling ratio is 4:2:0, the information amount is reduced so that four pixels including two horizontal pixels×two vertical pixels share one piece of color difference information.

Moreover, when the sampling ratio is 4:2:0, there are a case where the sampling positions of Cb and Cr agree with those of Y (the position agrees with one of four positions of Y) as shown in FIG. 4A and a case where the sampling position of Cb or Cr agrees with the center of four positions of Y as shown in FIG. 4B. The whole data size at the sampling ratio of 4:2:0 is (Y data size)+(¼×Cb data size)+(¼×Cr data size) in either of FIGS. 4A and 4B. Therefore, the data size at the sampling ratio of 4:2:0 is ½ of that at the sampling ratio of 4:4:4.

As described above, the sampling is performed to set the Y sampling frequency to be different from the Cb and Cr sampling frequencies, specifically reduce the information amounts of Cb and Cr, so that the data size can be reduced.

Next, the filtering of the YC signal will be described.

Figure 5:
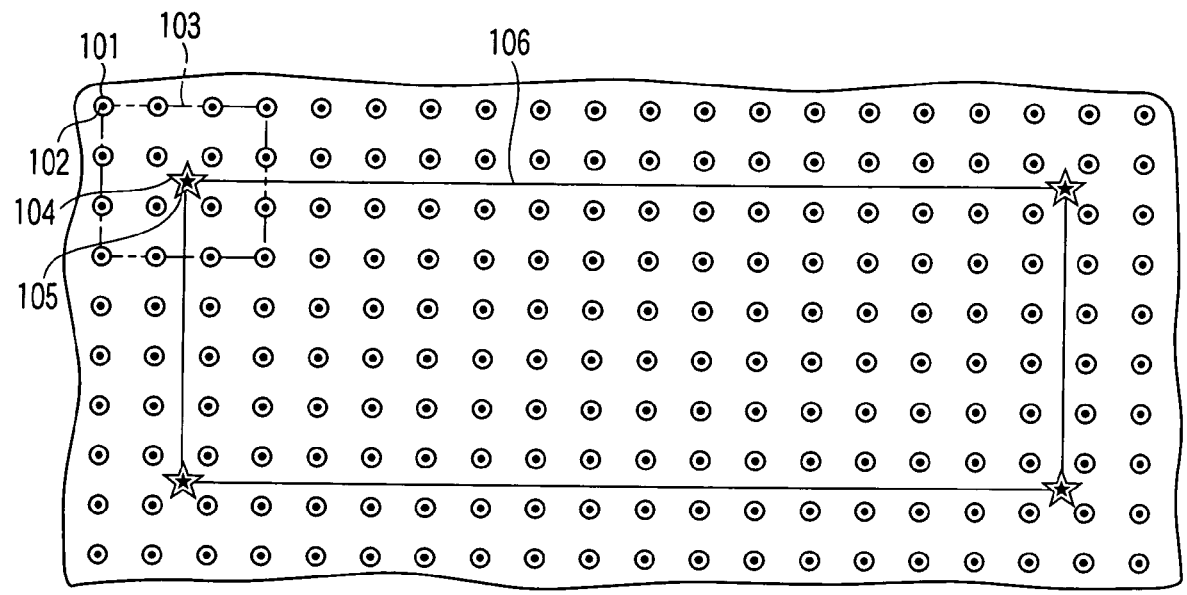
FIG. 5 is a diagram showing an outline of filtering of the YC signal having a sampling ratio of 4:4:4 by use of a 4×4 center interpolation filter.

FIG. 5 is a diagram showing an outline of the filtering of the YC signal having a sampling ratio of 4:4:4 as shown in FIG. 2 by use of a 4×4 center interpolation filter. It is to be noted that an example of FIG. 5 shows a case where an upper left end of the image is filtered.

Figure 6:
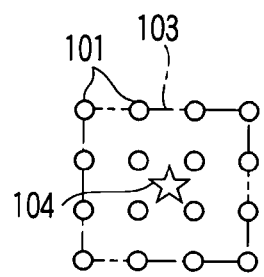
FIG. 6 is an explanatory view of the center interpolation filter.

FIG. 6 is an explanatory view of the center interpolation filter. The center interpolation filter interpolates data of a point 104 in the center of a filter 103 by use of data of a plurality of points 101 (16 points in the 4×4 filter) in the filter. The filter is used in, for example, low pass filter processing (LPF processing) to remove high-frequency components from the image signal, band pass filter processing (BPF processing) to extract specific-frequency components from the image signal and the like.

Since the sampling positions of Y can all agree with those of Cb and Cr at the sampling ratio of 4:4:4 as described above, a shape of the filter for processing Y can be matched with that of the filter for processing Cb and Cr. When the upper left end of the image is filtered using such filter 103, as to Y, the data of the point 104 shown in FIG. 5 is interpolated as the upper left end point. As to Cb and Cr, in the same manner as in Y, data of a point 105 shown in FIG. 5 is interpolated as the upper left end point.

Here, in a case where the center interpolation filter is used, since the only point in the center position of the filter can be interpolated, even if the whole image is filtered, an only region shown by reference numeral 106 is interpolated. Therefore, a field angle of the filtered image is smaller than that of the image before filtered as much as the region (margin) which is not interpolated by the filtering. Specifically, when the sampling ratio is 4:4:4, the field angle becomes smaller than that before the filter processing as much as the margins for three pixels in the horizontal direction (1.5 left pixels+1.5 right pixels in the example of FIG. 5) and the margins for three pixels in the vertical direction (1.5 upper pixels+1.5 lower pixels).

Figure 7A:
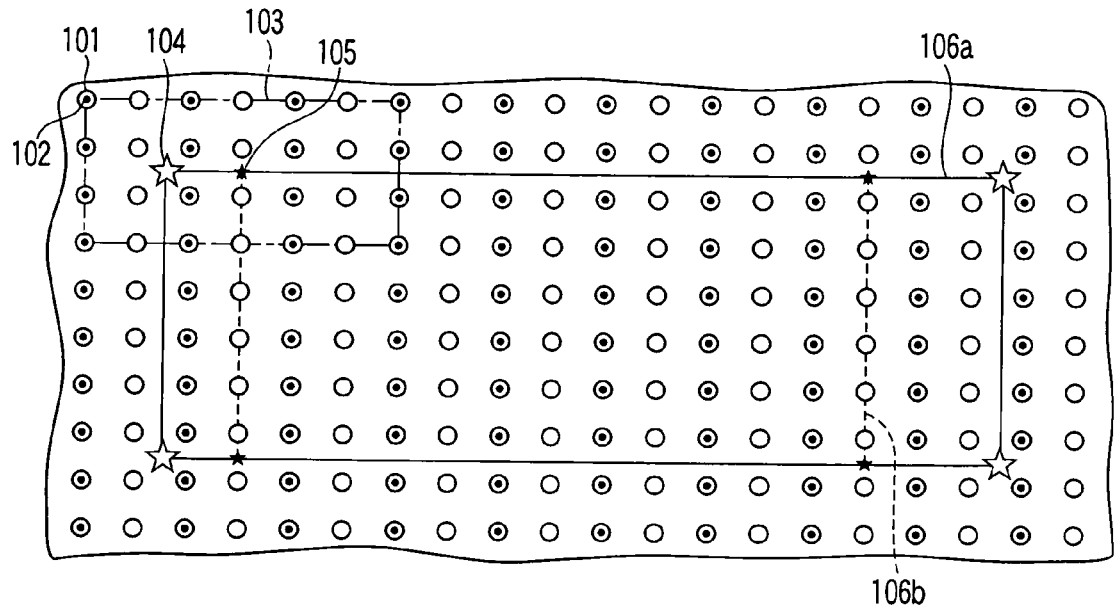
FIG. 7A is a diagram showing an outline of the filtering of the YC signal having a sampling ratio of 4:2:2 and arranged as shown in FIG. 3A by use of the 4×4 center interpolation filter.
Figure 7B:
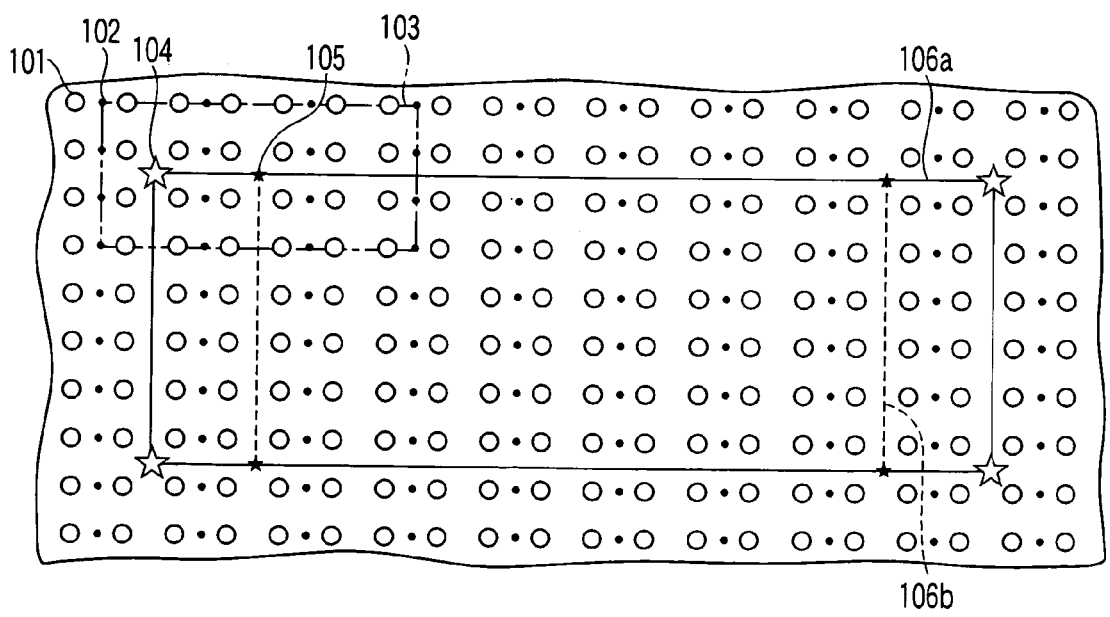
FIG. 7B is a diagram showing an outline of the filtering of the YC signal having a sampling ratio of 4:2:2 and arranged as shown in FIG. 3B by use of the 4×4 center interpolation filter.

Moreover, FIGS. 7A and 7B are diagrams showing an outline of the filtering of the YC signal having a sampling ratio of 4:2:2 by use of the 4×4 center interpolation filter. Here, FIG. 7A is a diagram showing a case where the YC signal arranged as shown in FIG. 3A is filtered, and FIG. 7B is a diagram showing a case where the YC signal arranged as shown in FIG. 3B is filtered.

It is to be noted that the filtering of Y is similar to that in a case where the sampling ratio is 4:4:4 as described with reference to FIG. 5. Therefore, here the filtering of Cb, Cr only will be described.

When the sampling ratio is 4:2:2, the information amount of Cb, Cr in the horizontal direction is reduced to ½ of that of Y. Therefore, in order to secure 16 points requiring the filter processing at the sampling ratio of 4:2:2, a width of the filter 103 in the horizontal direction needs to be twice the width at the sampling ratio of 4:4:4. When the upper left end of the image is filtered by use of such filter 103, the data of the point 105 shown in FIG. 7A or 7B is interpolated. That is, when Cb and Cr in the upper left end at the sampling ratio of 4:2:2 are filtered, the position of the interpolated upper left end point 105 obtained accordingly is on the right side of the position of the interpolated upper left end point 104 of filtered Y in the horizontal direction. Conversely, when Cb and Cr in the upper right end are filtered, the position of the interpolated upper right end point obtained accordingly is on the left side of the position of the interpolated upper right end point of filtered Y in the horizontal direction.

In a case where the Cb and Cr at the sampling ratio of 4:2:2 are filtered, since the width of the filter in the horizontal direction is large as compared with that at the sampling ratio of 4:4:4, a field angle (i.e., interpolatable region during the filtering) 106b after the filtering of Cb and Cr becomes smaller than a field angle 106a after the filtering of Y. Specifically, in the case of the sampling ratio of 4:2:2, the field angle is smaller than the field angle 106a of Y as much as the margin for four pixels in the horizontal direction (1.5 left pixels+2.5 right pixels in the example of FIG. 7A, 2 left pixels+2 right pixels in the example of FIG. 7B). Here, as to the field angle after the filtering, the field angle of Y needs to be matched with that of Cb and Cr, and a final field angle is limited by the smaller field angle, that is, the field angle of Cb and Cr. Therefore, the field angle after the filtering is smaller than that before the filtering as much as seven horizontal pixels and three vertical pixels.

Figure 8A:
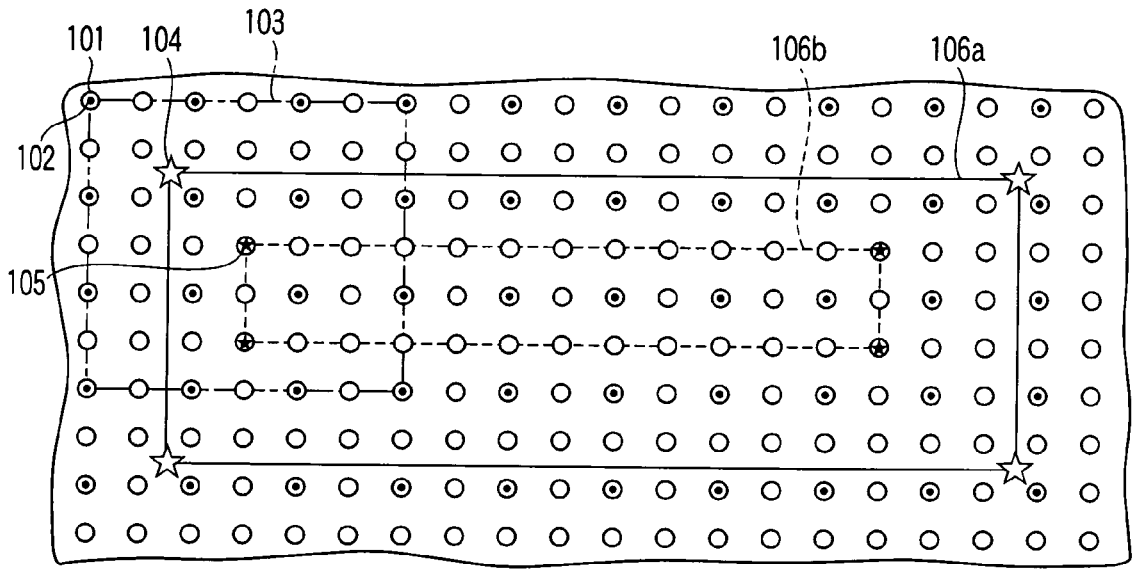
FIG. 8A is a diagram showing an outline of the filtering of the YC signal having a sampling ratio of 4:2:0 and arranged as shown in FIG. 4A by use of the 4×4 center interpolation filter.
Figure 8B:
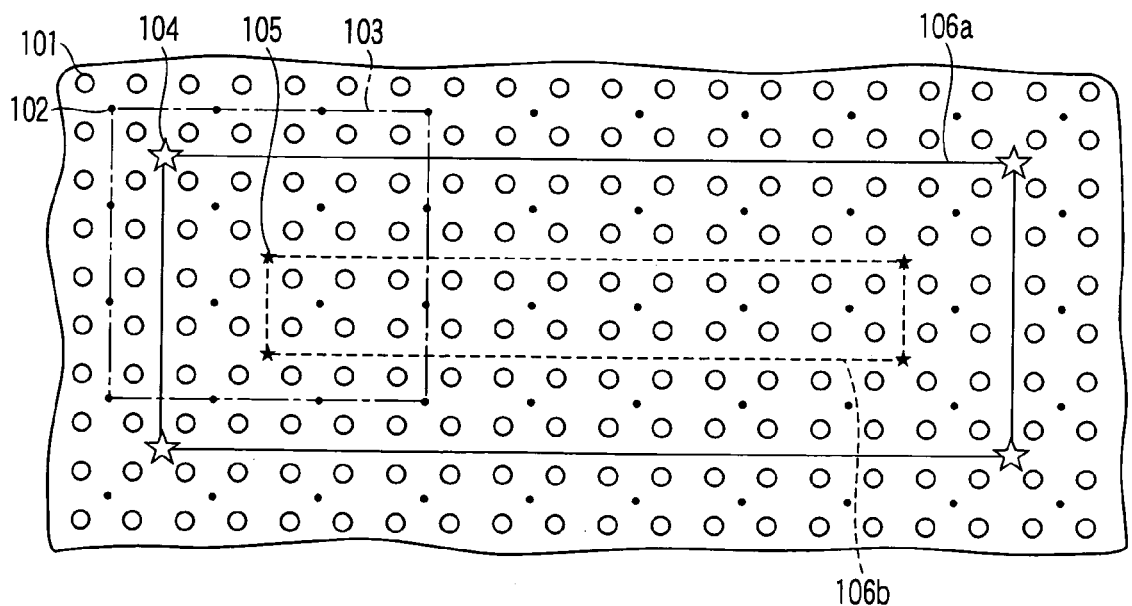
FIG. 8B is a diagram showing an outline of the filtering of the YC signal having a sampling ratio of 4:2:0 and arranged as shown in FIG. 4B.

Furthermore, FIGS. 8A and 8B are diagrams showing an example of the filtering of the YC signal having a sampling ratio of 4:2:0 as shown in FIG. 4A by use of the 4×4 center interpolation filter. Here, FIG. 8A is a diagram showing the filtering of the YC signal arranged as shown in FIG. 4A, and FIG. 8B is a diagram showing the filtering of the YC signal arranged as shown in FIG. 4B.

It is to be noted that the filtering of Y is similar to that at the sampling ratio of 4:4:4 described with reference to FIG. 5. Therefore, here the filtering of Cb, Cr only will be described.

When the sampling ratio is 4:2:0, each of the information amounts of Cb and Cr in the horizontal and vertical directions is reduced to ½ of that of Y. Therefore, in the case of the sampling ratio of 4:2:0, the width of the filter 103 in not only the horizontal direction but also the vertical direction is twice the width at the sampling ratio of 4:4:4. When the upper left end of the image is filtered by use of such filter 103, data of points 105 shown in FIG. 8A or 8B is interpolated. Therefore, when Cb and Cr in the upper left end at the sampling ratio of 4:2:0 are filtered, the position of the interpolated upper left end point 105 obtained accordingly is on the right side of the position of an interpolated upper left end point 104 of filtered Y in the horizontal direction and below the position in the vertical direction.

Therefore, a field angle 106b after the filtering of Cb and Cr at the sampling ratio of 4:2:0 is further smaller than that at the sampling ratio of 4:2:2. Specifically, in the case of the sampling ratio of 4:2:0, the field angle is smaller than that before the filtering as much as a margin for seven pixels in the horizontal direction (3 left pixels+4 right pixels in the example of FIG. 8A, 3.5 left pixels+3.5 right pixels in the example of FIG. 8B) and a margin for seven pixels in the vertical direction (3 upper pixels+4 lower pixels in the example of FIG. 8A, 3.5 upper pixels+3.5 lower pixels in the example of FIG. 8B).

It is to be noted that the 4×4 center interpolation filter has been described, but the above description also applies to the center interpolation filter having an arbitrary shape. In general, margins generated by the use of an m×n center interpolation filter are a horizontal margin m−1 and a vertical margin n−1 at the sampling ratio of 4:4:4, a horizontal margin (m−1)×2+1 and a vertical margin n−1 at the sampling ratio of 4:2:2, and a horizontal margin (m−1)×2+1 and a vertical margin (n−1)×2+1 at the sampling ratio of 4:2:0.

Figure 9:
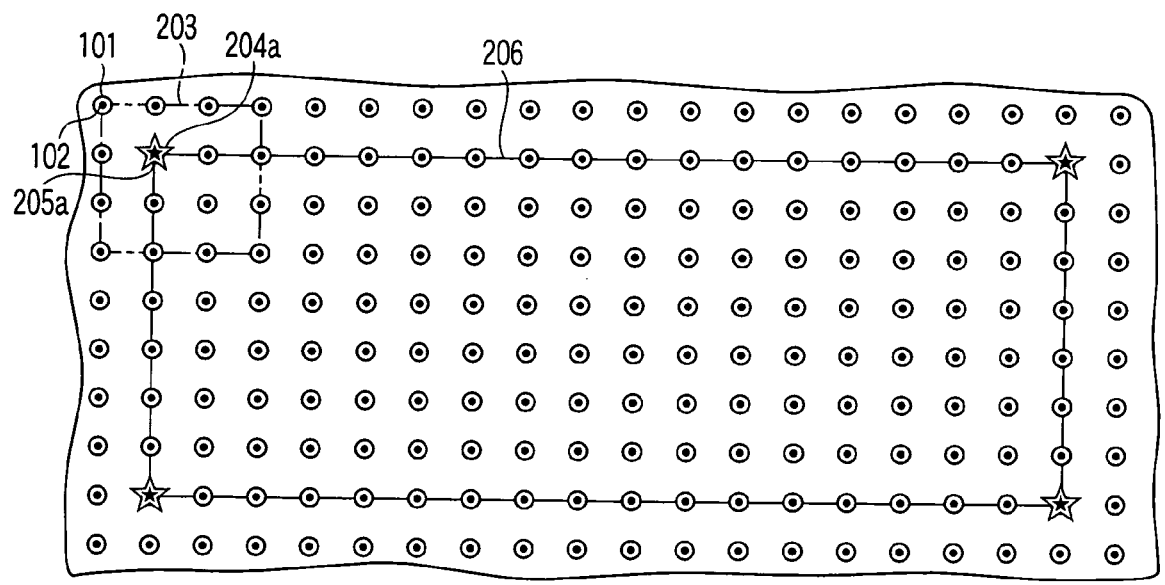
FIG. 9 is a diagram showing an outline of the filtering of the YC signal having a sampling ratio of 4:4:4 by use of a 4×4 weighting filter.
Figure 10A:
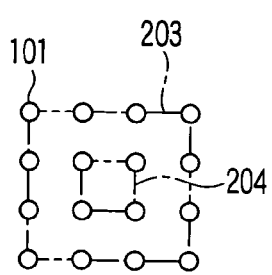
FIG. 10A is a diagram showing the 4×4 weighting filter.
Figure 10B:
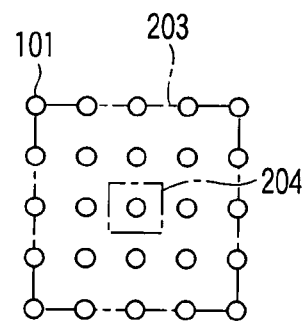
FIG. 10B is a diagram showing a 5×5 weighting filter.

FIG. 9 is a diagram showing a behavior of the filtering of the YC signal of FIG. 2 having a sampling ratio of 4:4:4 by use of a 4×4 weighting filter. FIGS. 10A and 10B are explanatory views showing the weighting filter. Here, FIG. 10A is a diagram showing the 4×4 weighting filter, and FIG. 10B is a diagram showing a 5×5 weighting filter.

The weighting filter interpolates data of a 1 pixel×1 pixel region 204 around a center position in a filter 203 by use of a plurality of points 101 (16 points in the 4×4 filter shown in FIG. 10A, 25 points in the 5×5 filter shown in FIG. 10B) in the filter. The filter is used in, for example, filter processing (e.g., cubic processing) for performing expansion and reduction processing (resize processing) of the image signal.

In the case of the sampling ratio of 4:4:4, since the sampling positions of Y can all agree with those of Cb and Cr as described above, a shape of the filter for processing Y can be matched with that of the filter for processing Cb and Cr. When the upper left end of the image is filtered using such filter 203, as to Y, data of a point 204a shown in FIG. 9 is interpolated as the upper left end point. As to Cb and Cr, in the same manner as in Y, data of a point 205a shown in FIG. 9 is interpolated as the upper left end point. Since the weighting filter can interpolate the region around the center position in the filter as shown in FIG. 9, a field angle 206 after the filtering becomes larger than a field angle 106 after the filtering by the center interpolation filter. However, the margin is not removed. Therefore, the field angle after the filtering becomes smaller than that before the filtering. Specifically, in the case of the sampling ratio of 4:4:4, a horizontal margin is two pixels (one left pixel+one right pixel), and a vertical margin is two pixels (one upper pixel+one lower pixel).

Figure 11A:
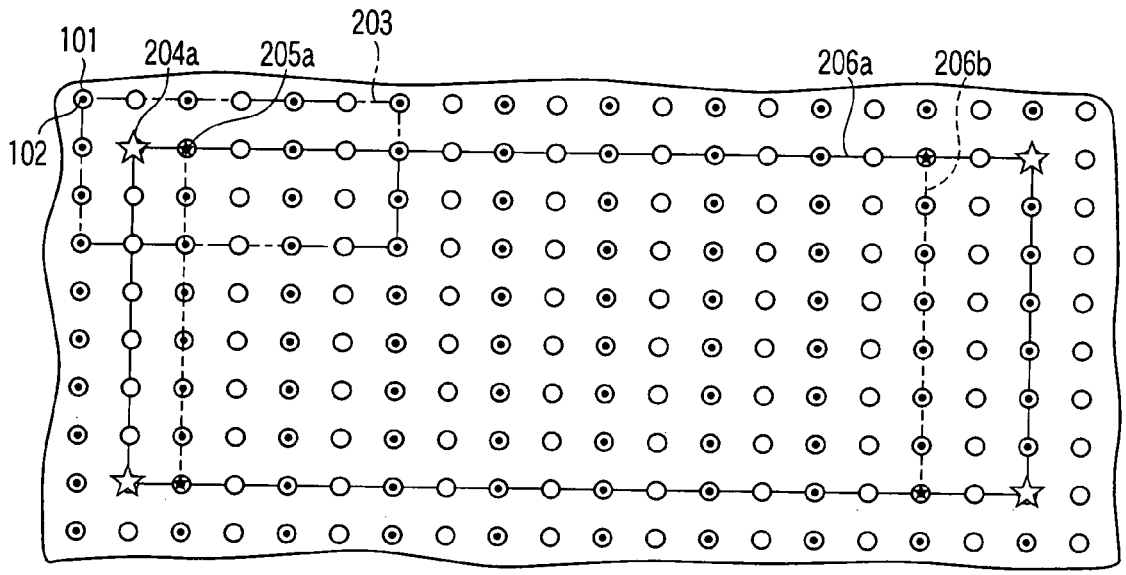
FIG. 11A is a diagram showing an outline of the filtering of the YC signal having a sampling ratio of 4:2:2 and arranged as shown in FIG. 3A by use of the 4×4 weighting filter.
Figure 11B:
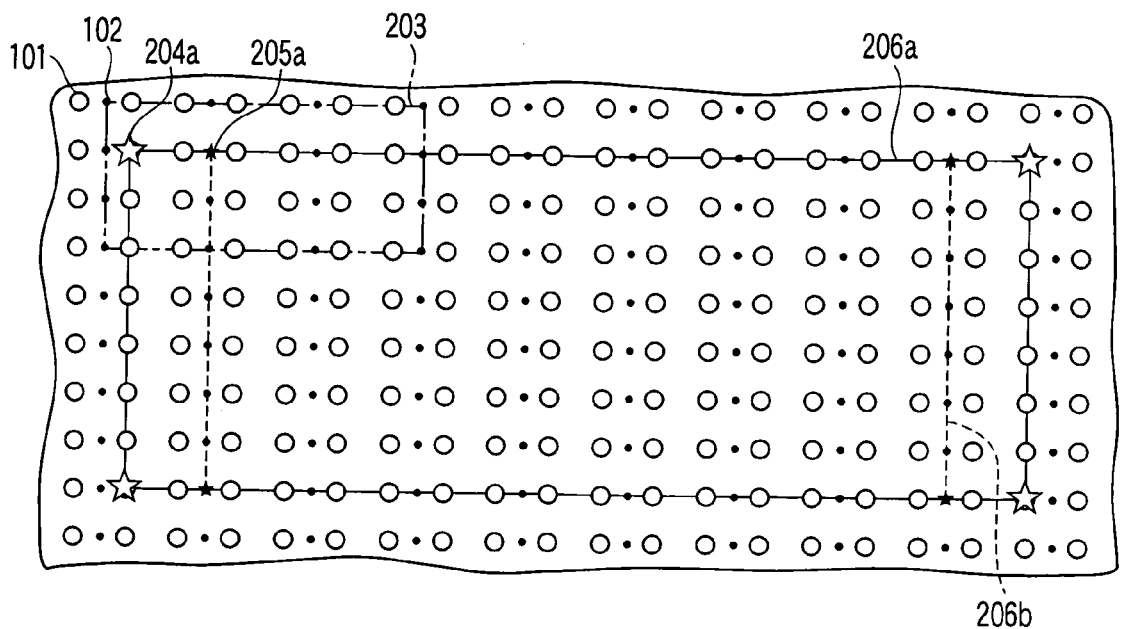
FIG. 11B is a diagram showing an outline of the filtering of the YC signal having a sampling ratio of 4:2:2 and arranged as shown in FIG. 3B by use of the 4×4 weighting filter.

FIGS. 11A and 11B are diagrams showing outlines of the filtering of the YC signal having a sampling ratio of 4:2:2 by use of the 4×4 weighting filter. Here, FIG. 11A is a diagram showing the filtering of the YC signal arranged as shown in FIG. 3A, and FIG. 11B is a diagram showing the filtering of the YC signal arranged as shown in FIG. 3B.

When Cb and Cr having the sampling ratio of 4:2:2 are filtered using the weighting filter, the upper left end point after the filtering is a point 205a on the right side of an end point 204a of interpolated Y in the horizontal direction. Therefore, in the same manner as in the center interpolation filter, a field angle 206b after the filtering of Cb and Cr becomes smaller than a field angle 206a after the filtering of Y. Specifically, in the case of the sampling ratio of 4:2:2, a horizontal margin corresponds to five pixels (two left pixels+three right pixels in the example of FIG. 11A, 2.5 left pixels+2.5 right pixels in the example of FIG. 11B). On the other hand, a vertical margin corresponds to two pixels (one upper pixel+one lower pixel).

FIGS. 12A and 12B are diagrams showing outlines of the filtering of the YC signal having a sampling ratio of 4:2:0 by use of the 4×4 weighting filter. Here, FIG. 12A is a diagram showing the filtering of the YC signal arranged as shown in FIG. 4A, and FIG. 12B is a diagram showing the filtering of the YC signal arranged as shown in FIG. 4B.

When Cb and Cr having the sampling ratio of 4:2:0 are filtered using the weighting filter, the upper left end point after the filtering is a point 205a on the right side of an end point 204a of interpolated Y in the horizontal direction and below the end point in the vertical direction. Therefore, in the same manner as in the center interpolation filter, a field angle 206b after the filtering of Cb and Cr becomes smaller than that in the case of the sampling ratio of 4:2:2. Specifically, in the case of the sampling ratio of 4:2:0, a horizontal margin corresponds to five pixels (two left pixels+three right pixels in the example of FIG. 12A, 2.5 left pixels+2.5 right pixels in the example of FIG. 12B). On the other hand, a vertical margin corresponds to five pixels (two upper pixels+three lower pixels in the example of FIG. 12A, 2.5 upper pixels+2.5 lower pixels in the example of FIG. 12B).

It is to be noted that the 4×4 weighting filter has been described, but the above description also applies to the weighting filter having an arbitrary shape. In general, margins generated by the use of an m×n weighting filter are a horizontal margin m−2 and a vertical margin n−2 at the sampling ratio of 4:4:4, a horizontal margin (m−2)×2+1 and a vertical margin n−2 at the sampling ratio of 4:2:2, and a horizontal margin (m−2)×2+1 and a vertical margin (n−2)×2+1 at the sampling ratio of 4:2:0.

As described above, in a case where the YC signals having different sampling ratios (e.g., sampling ratios of 4:2:2 and 4:2:0) are filtered, the field angle after the filtering is reduced as compared with a case where the YC signals having an equal sampling ratio (e.g., sampling ratio of 4:4:4) are filtered.

As described above, in consequence, it has been found that when the YC signal is stored in the memory or the like, the sampling ratios are varied in order to reduce the data size. When the YC signal is filtered, the sampling ratios may be set to be equal so that the field angle after the filtering can be kept to be large.

Therefore, in the present embodiment, the filtering is performed by the above-described technology.

FIG. 13A is a flowchart showing a flow of processing in an image processing method of the present embodiment. This processing is performed in filtering an image signal stored in the memory 5 and having a different sampling ratio (e.g., sampling ratio of 4:2:2). For example, the technology of FIG. 13A is applicable in a case where a JPEG image signal recorded in the memory card 8 is decoded and image processing such as gradation processing is performed. Here, the gradation processing is processing to gradate the image by subjecting the image signal to low pass filter processing a plurality of times.

When the processing of FIG. 13A starts, first the image processing section 6 having functions of a first converting section, a filtering section, and a second converting section reads out the image signal (sampling ratio of 4:2:2) stored in the memory 5 (step S1). Next, in the image processing section 6, the sampling ratio is converted (up-sampling) to match the sampling frequency of the image signal (step S2). Here, as a technology of the up-sampling, for example, Cb and Cr shared by two Ys may be rearranged in two Ys (Cb and Cr are copied). Such up-sampling converts the sampling ratio of the image signal into 4:4:4, and the field angle after the filtering can be kept to be large.

After end of the up-sampling, arbitrary filtering is performed (step S3). The image signal after the filtering has a state at the sampling ratio of 4:4:4. If the image signal is stored as such in the memory 5, a capacity of the memory 5 might be compressed. Therefore, after the filtering, the sampling ratio of the image signal is converted (down-sampling) in order to reduce the data size of the image signal (step S4). Accordingly, the sampling ratio of the image signal is converted into 4:2:2. The image signal having the converted sampling ratio is stored in the memory 5 (step S5), thereby ending the filtering.

Here, in the present embodiment, the processing is directly performed without storing the image signal in the memory 5 between the up-sampling of the step S2 and the down-sampling of the step S4.

It is to be noted that the filtering of FIG. 13A may be performed by a technology shown in FIG. 13B. In the technology of FIG. 13B, after converting the YC signal into an RGB signal, the filtering is performed. That is, in FIG. 13B, first the image processing section 6 reads out the image signal (sampling ratio of 4:2:2) stored in the memory 5 (step S11). Next, the up-sampling is performed in the image processing section 6 (step S12). Accordingly, the sampling ratio is converted into 4:4:4. Next, the YC signal having the converted sampling ratio of 4:4:4 is converted into the RGB signal (step S13). In this case, a ratio of sampling frequencies of R, G, B of the image signal is R:G:B=4:4:4.

After the image signal is converted into RGB, the arbitrary filtering is performed (step S14). Thereafter, the RGB signal is converted into the YC signal again (step S15). Moreover, this YC signal is down-sampled to reduce the data size of the image signal (step S16). The image signal having this converted sampling ratio is stored into the memory 5 (step S17), thereby ending the filtering.

After the conversion into the RGB signal, the filtering is performed as shown in FIG. 13B, so that each of color components of the image signal can be filtered.

Figure 14:
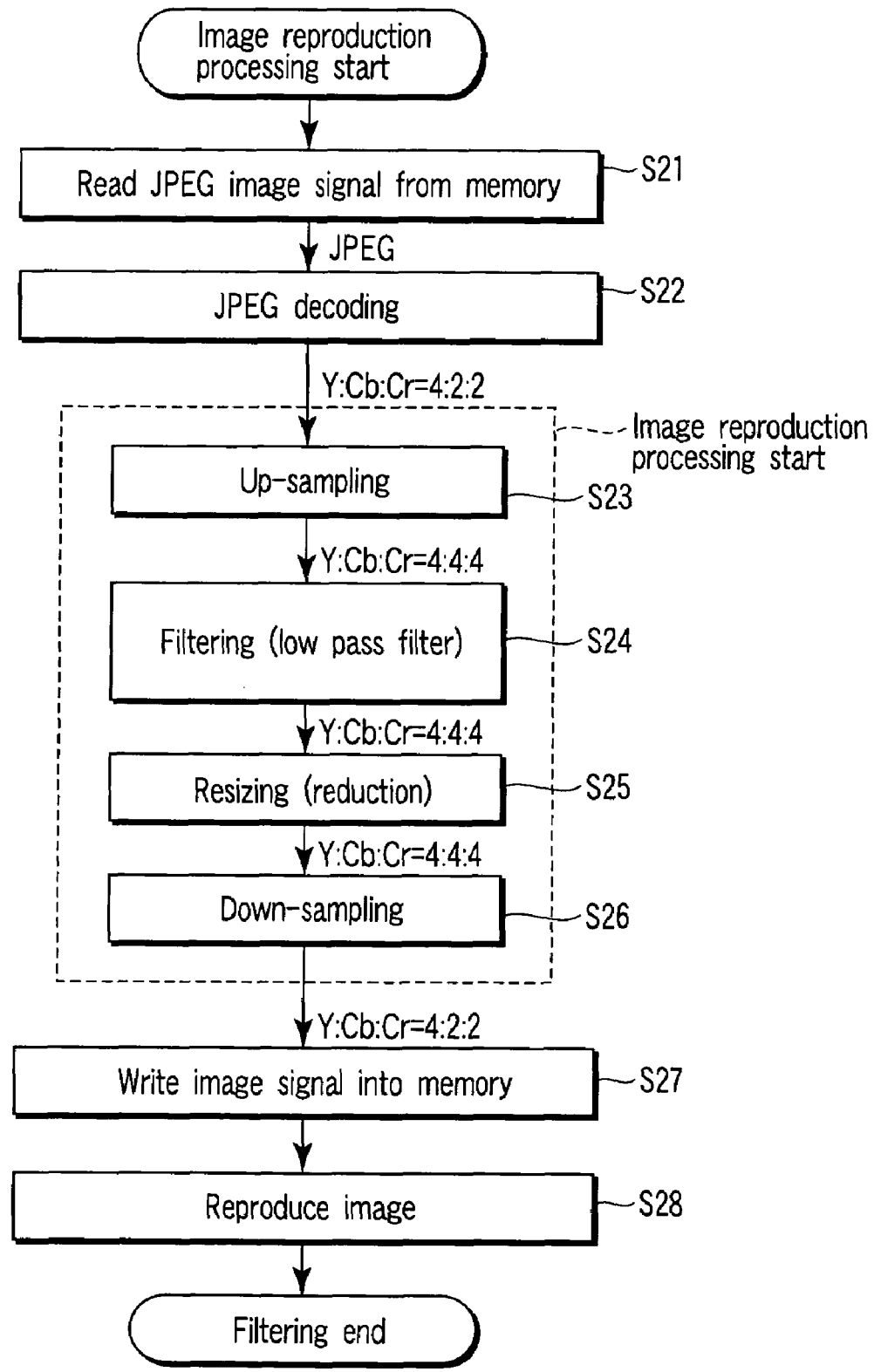
FIG. 14 is a flowchart showing a flow of image reproduction processing.

FIG. 14 is a flowchart showing a flow of processing in a case where a JPEG file stored in the memory card 8 is read out and reproduced in the display monitor 10.

When an instruction for image reproduction is made by a user or the like in FIG. 14, a JPEG image signal recorded in the memory card 8 is once stored in the memory 5. The JPEG image signal stored in the memory 5 is read out by the JPEG encoder and decoder 7 (step S21), and decoded (step S22). Accordingly, the JPEG image signal is converted into the YC signal (sampling ratio of 4:2:2).

Next, to reproduce the image, the YC signal is resized (in general, reduction processing). Therefore, the sampling ratio of the YC signal is converted (up-sampling) into 4:4:4 in accordance with the technology described with reference to FIG. 13A (step S23).

Next, the YC signal whose sampling ratio has been converted is subjected to low pass filter processing (step S24). In general, when the image is reduced, the maximum frequency that can be resolved drops. For example, an image having 1000 horizontal pixels can be resolved into 500 vertical stripes equally arranged in the horizontal direction, but as to an image having 500 horizontal pixels, the half, that is, 250 pixels only can be resolved. In this case, high-frequency components that cannot be resolved appear as other low-frequency components which have not originally existed. Therefore, the low pass filter processing is performed in consideration of the frequency at which the reduced image can be resolved, so that the low-frequency components which have not originally existed do not appear. It is to be noted that such low pass filter processing is nor required for enlarging the image.

After subjecting the image signal to the low pass filter processing, the image is reduced (step S25). Accordingly, a field angle of the image can be set to an appropriate field angle displayable in the display monitor 10. Since the sampling ratio of the YC signal is 4:4:4 during the low pass filter processing and the reduction processing, the field angle is not reduced more than required during the filtering.

After ending the reduction processing, the down-sampling is performed in order to reduce the data size of the image signal (step S26). Accordingly, the image signal whose sampling ratio has been converted into 4:2:2 is stored in the memory 5 (step S27). Thereafter, the image signal stored in the memory 5 is displayed as the image in the display monitor 10 via the video encoder 9 (step S28).

Here, the example of the filtering of the YC signal has been described with reference to the flowchart of FIG. 14, but the filtering may be performed after once converting the YC signal into the RGB signal as in the technology of FIG. 13B.

Moreover, the sampling ratio of the image signal after the down-sampling is 4:2:2 in the descriptions with reference to FIGS. 13A, 13B, and 14, but it may be set to 4:2:0.

As described above, according to the present embodiment, the ratio of the sampling frequencies of the respective image components of the image signal is changed when the image signal is stored in the memory 5 and when the image signal is filtered. Therefore, the capacity of the memory 5 is not compressed during the storing of the image signal, and the field angle can be kept to be large even after the filtering.

Here, the example of the application of the image processing device to the digital camera has been described above in the present embodiment, but the technology of the present embodiment may be applied to a general image processing device capable of performing the filter processing.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An image processing method comprising:
    reading, from a memory of a digital camera, an image signal which contains a plurality of image components and in which a sampling ratio as a ratio of sampling frequencies of these image components is not matched;
    converting, using an electronic image processing section of the digital camera, the sampling ratio of the image signal to match the sampling ratio of the read image signal;
    filtering, using an electronic image processing section of the digital camera, the image signal whose sampling ratio has been converted; and
    converting, using an electronic image processing section of the digital camera, the sampling ratio of the filtered image signal to reduce a data size of the filtered image signal.

2. The image processing method according to claim 1, wherein the converting of the sampling ratio of the image signal read from the memory is performed by up-sampling the image signal read from the memory, and the converting of the sampling ratio of the filtered image signal is performed by down-sampling the filtered image signal.

3. The image processing method according to claim 1, wherein the image signal whose sampling ratio is not matched every image component is a luminance and color difference signal in which a ratio of the image components is Y:Cb:Cr=4:2:2 or 4:2:0.

4. The image processing method according to claim 2, wherein the image signal whose sampling ratio is not matched every image component is a luminance and color difference signal in which a ratio of the image components is Y:Cb:Cr=4:2:2 or 4:2:0.

5. The image processing method according to claim 1, wherein the image signal obtained by matching the sampling ratio every image component is a luminance and color difference signal in which a ratio of the image components is Y:Cb:Cr=4:4:4, or an RGB signal in which a ratio of the image components is R:G:B=4:4:4.

6. The image processing method according to claim 2, wherein the image signal obtained by matching the sampling ratio every image component is a luminance and color difference signal in which a ratio of the image components is Y:Cb:Cr=4:4:4, or an RGB signal in which a ratio of the image components is R:G:B=4:4:4.

7. The image processing method according to claim 1, wherein the image signal obtained by converting the sampling ratio of the filtered image signal is a luminance and color difference signal in which a ratio of the image components is Y:Cb:Cr=4:2:2 or 4:2:0.

8. The image processing method according to claim 2, wherein the image signal obtained by converting the sampling ratio of the filtered image signal is a luminance and color difference signal in which a ratio of the image components is Y:Cb:Cr=4:2:2 or 4:2:0.

9. The image processing method according to claim 1, wherein the filtering includes at least one of low pass filter processing, band pass filter processing, and enlargement and reduction processing.

10. The image processing method according to claim 2, wherein the filtering includes at least one of low pass filter processing, band pass filter processing, and enlargement and reduction processing.

11. The image processing method according to claim 1, wherein the reading of the image signal from the memory and the converting of the sampling ratio to match the sampling ratio, the filtering of the image signal whose sampling ratio has been converted, and the converting of the sampling ratio to reduce the data size of the filtered image signal are performed without writing the image signal into the memory.

12. An image processing device which filters a digitized image signal, comprising:
a storage section to store an image signal which contains a plurality of image components and in which a sampling ratio is not matched every image component;
a first converting section which reads out the image signal stored in the storage section and which converts the sampling ratio of the image signal to match the sampling ratio every image component;
a filtering section which filters the image signal whose sampling ratio has been matched every image component by the first converting section; and
a second converting section which converts the sampling ratio of the filtered image signal to reduce a data size of the image signal filtered by the filtering section.

* * * * *